(12) United States Patent
Öhlander et al.

(10) Patent No.: US 7,076,133 B2
(45) Date of Patent: Jul. 11, 2006

(54) OPTICAL COUPLING

(75) Inventors: Ulf Öhlander, Hässelby (SE); Sten Helmfrid, Kista (SE); Bengt Sahlgren, Saltsjö-Boo (SE)

(73) Assignee: Proximion Fiber Systems AB, Kista (SE)

( * ) Notice: Subject to any disclaimer, the term of this patent is extended or adjusted under 35 U.S.C. 154(b) by 245 days.

(21) Appl. No.: 10/451,988

(22) PCT Filed: Dec. 27, 2001

(86) PCT No.: PCT/SE01/02905

§ 371 (c)(1),
(2), (4) Date: Feb. 4, 2004

(87) PCT Pub. No.: WO02/054126

PCT Pub. Date: Jul. 11, 2002

(65) Prior Publication Data

US 2004/0131312 A1     Jul. 8, 2004

(30) Foreign Application Priority Data

Dec. 29, 2000   (SE) .................................. 0004897

(51) Int. Cl.
G02B 6/26       (2006.01)
G02B 6/34       (2006.01)
(52) U.S. Cl. ............................. 385/37; 385/27; 385/31
(58) Field of Classification Search .................... 385/37
See application file for complete search history.

(56) References Cited

U.S. PATENT DOCUMENTS

| 5,016,967 | A | * | 5/1991 | Meltz et al. ................... 385/37 |
| 5,042,897 | A |   | 8/1991 | Meltz et al. |
| 5,061,032 | A | * | 10/1991 | Meltz et al. ................... 385/37 |
| 5,307,437 | A | * | 4/1994 | Facq et al. .................... 385/124 |
| 5,430,817 | A | * | 7/1995 | Vengsarkar ................... 385/37 |
| 5,982,962 | A | * | 11/1999 | Koops et al. .................. 385/37 |
| 6,198,557 | B1 | * | 3/2001 | Dultz et al. .................. 398/102 |
| 6,211,957 | B1 | * | 4/2001 | Erdogan et al. ............ 356/364 |
| 6,501,879 | B1 | * | 12/2002 | Asseh et al. ................... 385/37 |
| 6,563,980 | B1 | * | 5/2003 | Dultz et al. .................... 385/27 |

FOREIGN PATENT DOCUMENTS

EP         0 840 150        5/1998

* cited by examiner

*Primary Examiner*—Michelle Connelly-Cushwa
(74) *Attorney, Agent, or Firm*—Buchanan Ingersoll PC

(57) ABSTRACT

The invention relates to the coupling of light to and from an optical waveguide, such as an optical fiber. Light of a specific wavelength is deflected out from the fiber, or into the fiber, in a substantially transverse direction with respect to the propagation direction of light in the waveguide, by a deflector 16 arranged in the fiber core 10. Wavelength selectivity of the deflector 16 is provided by a Bragg grating means located in the fiber core 10. The deflected light is collimated, or converged towards a focus, by an interface 15 between a cladding 11, having one index of refraction, and an outer medium 12, having another index of refraction. The ratio between the radius of the cladding 11 and the radius of the core 10 made sufficiently small for the collimating, or converging, effect to appear.

8 Claims, 5 Drawing Sheets

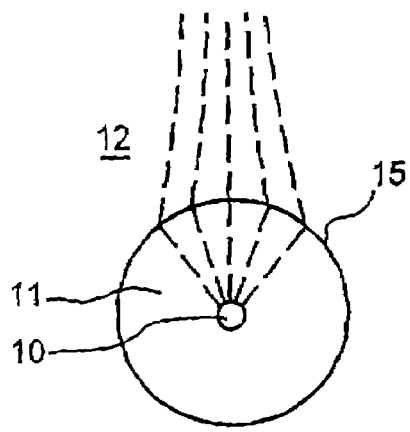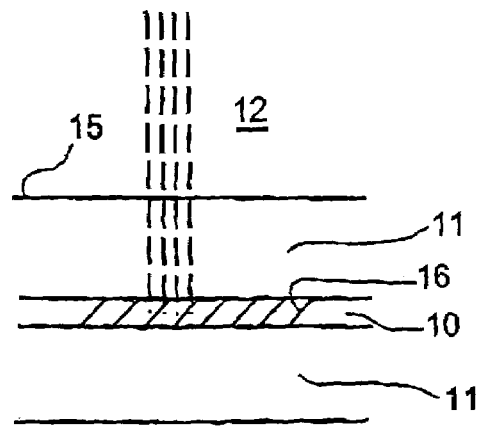
Fig. 1a  Fig. 1b
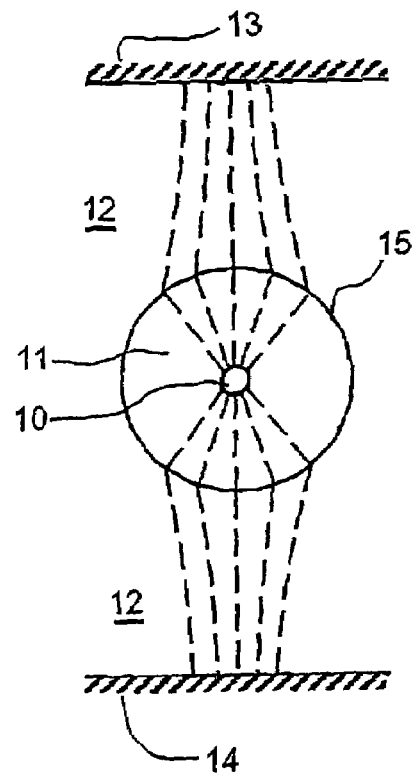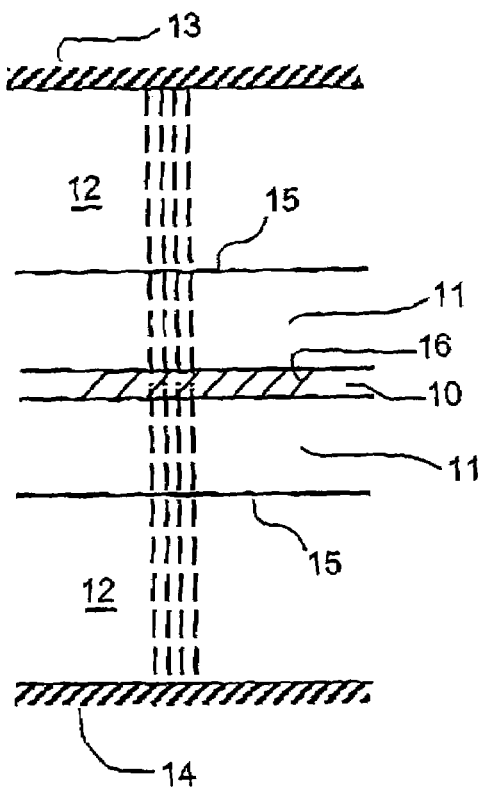
Fig. 2a  Fig. 2b

OPTICAL COUPLING

TECHNICAL FIELD

The present invention relates to an optical coupling arrangement for coupling light in to and out from an optical waveguide, preferably an optical fibre.

TECHNICAL BACKGROUND

Light guiding in optical waveguides, and light guiding in optical fibres in particular, is a well-known technology for transporting energy and information in the form of light. For example, as in the case of optical fibres, one-dimensional optical waveguides are based on light guiding in a medium of cylindrical symmetry. The light guiding takes place in a core, which is surrounded by a medium having a lower refractive index, the so-called cladding, light guiding according to a simple model being obtained by means of repeated total internal reflections between the core and the cladding. However, the light can only propagate in certain predetermined directions, so-called modes, which are defined by certain phase conditions which must be met in connection with the propagation of the light. According to the standard model, these modes consist of eigensolutions to Maxwell's equations applying existing cylindrical boundary conditions.

If the cross-sectional dimension of the core is sufficiently small, the light can only propagate in a single such mode. An optical waveguide with this characteristic is called an optical monomode waveguide. Monomode waveguides have certain important advantages over a waveguide permitting several modes (multimode waveguide). For example, the information transfer capacity of an optical monomode fibre, often called an optical single-mode fibre, is much greater than that of a multimode fibre when light is guided through a long fibre. Another important advantage of a monomode waveguide such as a single-mode fibre is its lack of ambiguity. Apart from the polarisation state of the light, the characteristics of the light will be well-defined along the entire waveguide. In particular, the intensity distribution of the light will be well-defined along the entire waveguide. This is extremely important in order to provide predictable operation of waveguide-based components.

Generally, several separate channels are utilised in order to increase the transfer capacity of an optical waveguide, each channel consisting of a specific light wavelength. This technology is called wavelength division multiplexing or WDM. In connection with WDM it is thus desirable to be able to add and subtract single wavelength channels, i.e. single light wavelengths, to and from the waveguide.

A well-known technology for wavelength-selective alteration of the propagation direction of light utilises optical phase gratings. An optical phase grating is a structure of essentially periodically varying refractive index in an optically transparent medium. When light is incident upon an optical phase grating a small part of the incident light is reflected by each grating element (period). When a plurality of grating elements are arranged in succession (i.e. arranged in a phase grating) the total amount of reflected light will be the sum of all of these separate reflections. The part of the incident light that is reflected by each grating element depends on the depth (amplitude) of the refractive index modulation of the phase grating, i.e. on the refractive index difference of the grating elements. The greater the modulation the greater the part of the incident light that is reflected by each phase element. If the propagation direction of the light which is incident upon a phase grating is essentially perpendicular to the grating, i.e. to the normal of the grating elements, the grating is said to be operating in the Bragg domain and is called a Bragg grating. As a result of the perpendicular incidence the light will be reflected essentially parallel to the direction of incidence (i.e. in the opposite propagation direction). The light which is reflected by each grating element will thus overlap the light reflected by all the other grating elements, thus giving rise to interference. In a monomode waveguide, all reflections within a certain angle cone will couple to the only mode (propagation direction) permitted by the waveguide. In the case of the wavelength where these reflections are in phase, constructive interference arises, and despite the fact that each grating element only provides a low intensity reflection, substantial reflection will be obtained for this wavelength from the grating as a whole. This wavelength, at which a substantial reflection is obtained from the grating as a whole, is called the Bragg wavelength $\lambda_{bragg}$ and is given (in connection with perpendicular incidence) by $$\lambda_{bragg} = 2n\Lambda$$

where n is the average value of the refractive index and $\Lambda$ is the period of the phase grating. The reflectance for the Bragg wavelength is given by $$R_{bragg} = \tan h^2 \kappa L$$

where L is the length of the Bragg grating in the propagation direction of the light and $\kappa$ is defined as $$\kappa = \frac{4\pi \Delta n}{\lambda}$$

where $\Delta n$ is the amplitude of the refractive index modulation. Since the refractive index modulation $\Delta n$ typically is small ($10^{-5}-10^{-3}$), the above expression of the reflectance can be expanded into a power series, whereby it can be seen that the reflectance is approximately proportional to the square of $\Delta n$.

If the angle of incidence of the light upon the phase grating is not perpendicular, i.e. if the grating planes are inclined, the light will not be reflected in the direction of incidence. By utilising an inclined phase grating, also known as a blazed grating, light can be coupled out from the core of the waveguide. Similarly, light can be coupled into the core of the waveguide by means of a blazed grating.

U.S. Pat. No. 5,042,897 (Meltz et al.) describes a device for coupling light from a waveguide with the aid of tilted (blazed) gratings, i.e. phase gratings having grating elements (refractive index variations) whose planes intersect the propagation axis of the waveguide under an angle which is different from 90 degrees. The angle at which the light will be coupled from the waveguide is determined by the angle of inclination of the grating elements in relation to the propagation axis of the waveguide (the transverse phase matching condition) as well as by the wavelength (the longitudinal phase matching condition). The tilted grating elements function as small, almost completely transparent, mirrors. The diameter of the mirrors (grating elements) is essentially equal to the diameter of the waveguiding structure. In a single-mode fibre, for example, the waveguiding structure is composed of the core of the fibre, which usually has a diameter of about 10 micrometers. Since this diameter is not much greater than the wavelength of the light, the mirrors (grating elements) will cause diffraction of the reflected light. Consequently, the reflected light will spread out in a cone around the angle defined by the angle of inclination of the grating elements. The transverse phase matching condition gives that this angle is about twice as large as the angle of inclination. Since the grating elements reflect light which is partially overlapping, a certain wavelength will only give rise to constructive interference if the light from each consecutive grating element is in phase with the light from the preceding grating element. This occurs at a certain predetermined angle, which is given (for a longitudinal grating) by the longitudinal phase matching condition $$\frac{2\pi N_{eff}}{\lambda} + \frac{2\pi n_{clad}}{\lambda}\cos\varphi_L = \frac{2\pi}{\Lambda}\cos\theta_g$$

where $N_{eff}$ and $n_{clad}$ are the refractive indices of the waveguiding structure (core) and the substrate (cladding) respectively, the substrate being assumed, in the above expression, to have an infinite extension, $\phi_L$ being the output-coupling angle in the cladding, and $\theta_g$ being the angle of inclination.

Hence, light coupled out from a waveguiding core by means of blazed gratings will exhibit significant divergence. Obviously, this divergence causes problems when the light is to be further processed. For example, it might be desirable to detect the light, modulate the light or direct the light into another waveguiding core. Consequently, improvements are needed in order to overcome this problem of divergence.

It is to be understood that light beams, as described in this application, are to be regarded as Gaussian beams. For example, this means that beams exhibit a waist when focused, and are diffraction limited as regards divergence. The characteristic features of Gaussian beams are well k)own to the man skilled in the art.

SUMMARY OF THE INVENTION

It is an object of the present invention to eliminate, or at least alleviate, the problems of divergence in connection with transverse coupling of light to or from a waveguide, such as an optical fibre. This object is achieved by an arrangement in accordance with the appended claims.

Typically, in a photosensitised fibre adapted for grating writing, the core has a diameter of a few micrometers (about 5 μm) and the cladding has a diameter of more than 100 micrometers (about 125 μm). The difference in diameter between the core and the cladding is large enough for light deflected out from the core to act as coming from a point source (or a line source in the case of distributed deflection) with respect to the outer boundary of the cladding. Thus, light deflected transversally out from the core of the fibre will propagate radially out from the core. It is to be understood that, due to diffraction, the deflected light will spread out in a fan-like fashion from the core. Consequently, when light from the core reaches the cylindrical interface between the cladding and an outer medium, the angle of incidence is normal or very close to normal. Therefore, the light will not be refracted to any noticeable extent, regardless of the difference in retractive index between the cladding and the outer medium.

The present invention is based on the recognition that if the cladding of an optical fibre is provided with a small enough diameter, light deflected out from the core of the fibre will no longer act as a point source (or line source) of light. Rather, if the cladding has a diameter that is sufficiently small compared to the diameter of the core, light deflected out from the core will propagate as if coming from a distributed source. Hence, when the light reaches the interface between the cladding and the outer medium, at least some of the light will be refracted, since the angle of incidence is greater than zero, at least for some portion of the deflected light. According to the invention, this effect is utilised in order to achieve a converging effect when light deflected from the fibre core passes the interface between the cladding and the outer medium. Said converging effect can be utilised either for collimating the deflected light outside of the cladding, or for converging the deflected light towards a focus.

Thus, according to the present invention, an arrangement comprising a waveguide, preferably an optical fibre, having a core and a cladding is also provided with an outer medium interfacing the cladding. In the core, there is provided a deflector operative to deflect light in to and out from said core. The refractive index of the outer medium is chosen so that it differs significantly from that of the cladding, and the diameter of the cladding is such that light emanating from the core will have an angle of incidence on the interface between the cladding and the outer medium greater than zero. Consequently, light passing the interface between the cladding and the outer medium is refracted. By a proper choice of refractive indices of the cladding and the outer medium, and curvature of said interface there between (i.e. diameter of the cladding), light coupled out from a waveguiding core can be focused a predetermined distance away from the interface. Similarly, light can be coupled in to the waveguiding core in an advantageous manner by arranging a light source at or near said focus.

In one aspect, the present invention provides an optical coupling arrangement for coupling light transversally out from an optical waveguide, such as an optical fibre. The arrangement comprises a deflector provided in a core of the optical waveguide, said deflector being operative to deflect light in said core in a substantially transverse direction out therefrom. Further, the arrangement comprises a cladding interfacing the waveguiding core, said cladding having a refractive index which is lower than the refractive index of the core, in order to allow waveguiding in said core. The arrangement also comprises an outer medium interfacing said cladding, said outer medium having a refractive index that substantially differs from the refractive index of the cladding. Furthermore, the curvature of the interface between the cladding and the outer medium is such that light passing said interface is converged, and preferably focused at a predetermined distance away from the waveguiding core. In a cylindrical symmetry, as in the case of an optical fibre, the refractive effect of the interface between the cladding and the outer medium is achieved by the cladding having a diameter that is small enough, so that light emanating from the core has an angle of incidence with respect to said interface which is greater than zero. As described above, when the diameter of the cladding is sufficiently small, the core will no longer act as a point or line source of light.

In order to allow wavelength selective coupling of light from the waveguiding core, said core is preferably also provided with at least one planar Bragg grating that establishes a resonance to a predetermined wavelength. The planar grating is preferably superimposed upon a blazed phase grating constituting the deflector. Consequently, said predetermined wavelength exhibits an increased power density at said resonance, whereby the deflection of the resonant wavelength out from the waveguiding core is enhanced. It is preferred that the planar Bragg grating is a chirped Bragg grating with a large amplitude of the refractive index modulation, thereby establishing resonances to different wavelengths in different portions thereof. Consequently, different wavelengths are coupled out from the core at different positions by the distributed deflector, i.e. the blazed phase grating.

In another aspect, the present invention provides an optical coupling arrangement for coupling light transversally into an optical waveguide, such as an optical fibre. The arrangement comprises a deflector provided in a core of the optical waveguide, said deflector being operative to deflect light into said core from a direction that is substantially transverse to the propagating direction of light in the waveguiding core. The deflector has the feature of deflecting different wavelength components at different positions along the same, the arrangement for coupling light thereby being wavelength selective. The arrangement also comprises a cladding interfacing said core, and an outer medium interfacing said cladding. The refractive index of the cladding is lower than the refractive index of the core, in order to allow waveguiding in said core. The refractive index of the outer medium differs substantially from the refractive index of the cladding, and the cladding has a sufficiently small diameter for the core to act as a distributed light source, light passing the interface between the cladding and the outer medium thereby being refracted, since the angle of incidence on the interface between the cladding and the outer medium is greater than zero.

Preferably, the deflector is comprised of a distributed Bragg-reflector that is tilted with respect to the propagation direction in the core of the waveguide, such distributed reflector also being know as a blazed phase grating.

In one preferred embodiment of the present invention, an optical coupling arrangement comprises an optical fibre having a core and a cladding, the cladding having a sufficiently small diameter in order for the above-described converging effect to be noticeable. An outer medium surrounds the cladding of the fibre and has a refractive index that differs substantially from the refractive index of the cladding, light passing the interface between the cladding and the outer medium thereby being refracted due to the non-normal angle of incidence on said interface. In the core of the fibre there is provided a blazed phase grating operative to deflect light propagating in said core out therefrom in a substantially transverse direction. The core is further provided with a chirped Bragg grating that establishes a plurality of resonance regions, each resonance region being resonant to a different wavelength component of the light propagating in the fibre core. Furthermore, the cladding of the fibre has a diameter such that light deflected from the core is focused, by the refracting power of the interface between the cladding and the outer medium, at a predetermined distance away from said core. By virtue of the presence of the chirped grating and the resonances established by the same, different wavelength components are deflected at different positions along said grating. Hence, different wavelength components deflected from the fibre core are brought to a focus at different positions along the fibre. Thus, an arrangement according to the present invention provides transverse wavelength selective coupling of light from an optical fibre, wherein each wavelength component is brought to a focus outside of the fibre.

It is to be understood that the propagation of light is time-invariant, meaning that the propagation direction can always be inverted. If light can propagate in one direction along a path through an optical system, light can also propagate in the opposite direction along the same path. Consequently, wherever a propagation direction is mentioned in this specification, light can also propagate in the opposite direction. Specifically, this implies that wherever coupling of light from a waveguiding core is described, the same arguments and facts apply also to coupling of light into a waveguiding core, where applicable.

BRIEF DESCRIPTION OF THE DRAWINGS

In the following, a number of preferred embodiments of the present invention will be described in greater detail. The various objects and advantages of the invention will be more fully appreciated when the detailed description is read in conjunction with the accompanying drawings, on which;

FIGS. 1a and 1b schematically show an embodiment of the present invention, in lateral and longitudinal cross-section, respectively;

FIGS. 2a and 2b schematically show another embodiment of the present invention, in lateral and longitudinal cross-section, respectively;

In the figures, like parts are designated by like reference numerals. Also, light rays are indicated by broken lines. Since the propagation of light is time-invariant, the propagation direction is not indicated in the figures.

DETAILED DESCRIPTION OF PREFERRED EMBODIMENTS

Figure 3:
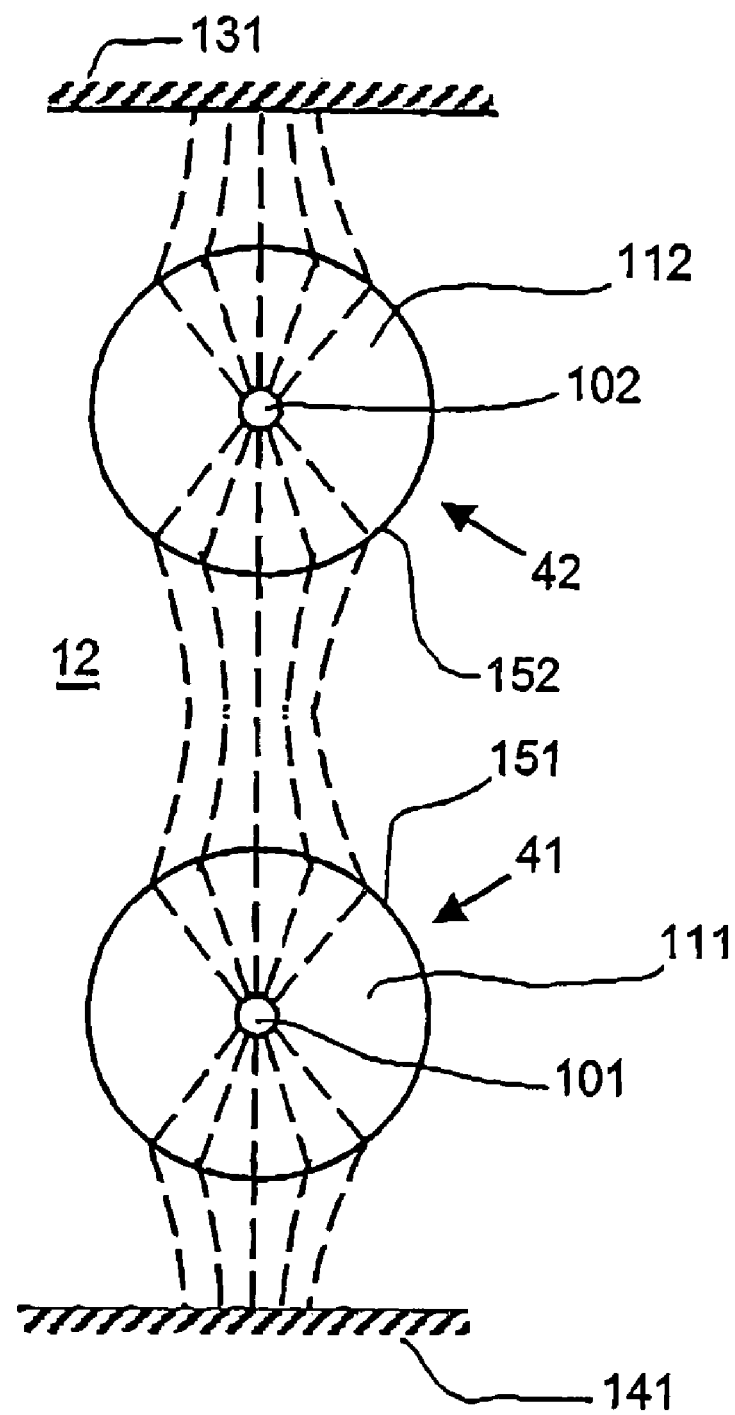
FIG. 3 schematically shows an embodiment of the present invention, comprising two optical fibres between which light is coupled.

In FIGS. 1a and 1b, an arrangement is shown comprising a core 10, a cladding 11 and an outer medium 12. In the core 10, there is provided a deflector 16, comprised of a blazed phase grating. In the arrangement shown, light is deflected in one direction only from the fibre core 10. Said light is converged by the interface 15 between the cladding 11 and the outer medium 12, and brought to a focus outside of the optical fibre (formed by the core 10 and the cladding 11). The shown situation is very useful when launching light of a specific wavelength into the optical fibre, or when detecting light of a specific wavelength deflected out from the fibre. The shown arrangement is, in a sense, a fundamental building block of arrangements according to the present invention. It can also advantageously be applied when modulating light coming from the fibre, or light to be coupled into the fibre. The different aspects of the arrangement will be further described below.

In order to achieve a converging effect at the interface 15 between the cladding 11 and the outer medium 12, the diameter of the cladding 11 must be sufficiently small compared to the diameter of the core 10. As mentioned above, a standard photosensitised fibre for grating writing has a core with a diameter of about 5 μm and a cladding with a diameter of about 125 μm. In such a fibre, the diameter of the cladding is so large, that light emanating from the core (i.e. that is deflected out from the core in a substantially transverse direction) act essentially as a point or line source. Consequently, the angle of incidence on said interface is normal or very close to normal, and refraction of light at said interface is negligible. If, however, the diameter of the cladding is made sufficiently small, than light from the core will act as coming from a distributed light source. Hence, at least some portion of said light will be incident upon said interface at an angle greater than zero and therefore be refracted. The refraction of light at the interface does not come into force linearly when the ratio between the cladding diameter and the core diameter decreases. Rather, there is a distinct threshold interval where refraction at the interface becomes noticeable.

With a core diameter of about 4 μm, the cladding must have a diameter of about 45 μm or less for the converging effect to be noticeable. If the diameter of the core is about 6 μm, the diameter of the cladding must be about 100 μm or less before the converging effect is pronounced.

One embodiment of the present invention is shown in FIGS. 2a and 2b. Here, a core 10 and a cladding 11 of an optical fibre, as well as an outer medium 12, is enclosed by an external resonator. The refractive index of the fibre core 10 is higher than the refractive index of the fibre cladding 11, at least within a predetermined wavelength range, in order to enable waveguiding in said core 10, The diameter of the cladding 11 is sufficiently small in order to provide non-normal incidence on the interface 15 between the cladding 11 and the outer medium 12. The refractive index of the outer medium 12 differs substantially from the refractive index of the cladding 11, light passing the interface 15 between the cladding and the outer medium thereby being refracted. Furthermore, the cladding 11 of the fibre is provided with a diameter such that light passing the interface 15 between the cladding 11 and the outer medium 12 is converged towards a focus outside the fibre, or at least collimated.

The external resonator enclosing the fibre is defined by a first 13 and a second 14 mirror interfacing said outer medium 12. Preferably, the mirrors 13 and 14 are placed at or near a location where light emanating from the fibre core 10 is brought to a focus by the converging power of the interface 15 between the cladding 11 and the outer medium 12. In the core 10 of the fibre, there is provided a deflector 16 comprised of a blazed phase grating. The blazed grating is operative to deflect light propagating in the core 10 in a substantially transverse direction out from the same. Consequently, light will be deflected by the blazed grating into the external resonator, and the converging power of said interface 15 will promote the stability of said resonator. Conveniently, light could be coupled out from or in to the fibre core 10 by means of said external resonator.

Superimposed upon the blazed phase grating in the fibre core, there is provided a chirped Bragg grating. With a view to keeping the figures intelligible, said chirped grating is not shown. The chirped grating has a modulation amplitude that is large enough to establish resonances to different wavelength components at different portions thereof. Consequently, a specific wavelength component will exhibit an increased power density at a specific portion of the fibre core, due to the presence of said resonance. The increased power density at said specific portion will enhance the deflection of the corresponding wavelength. The deflecting power of the blazed grating can thus be made small enough to render deflection of non-resonant wavelength components negligible. Hence, for example, different wavelength channels of a wavelength division multiplexed optical signal propagating in the fibre core will be deflected at different portions of the fibre core. Each of these channels is converged towards a focus outside the optical fibre by the converging power of the interface between the fibre cladding and the outer medium and captured inside a respective external cavity.

With the geometry shown on the drawing, the refractive index of the outer medium 12 must be lower than the refractive index of the cladding 11 in order to achieve a converging effect at the interface 15. In other respects, the outer medium 12 can be comprised of any material, such as air, glass or plastic, as long as the above requirement on the refractive index is met.

FIG. 3 shows an embodiment of the present invention in which light is coupled from a first fibre 41 to a second fibre 42. The first 41 and the second 42 fibre comprise a respective core 101, 102 and cladding 111, 112. Between said two fibres there is provided an outer medium 12, which interfaces both the first fibre cladding 111 and the second fibre cladding 112. The refractive index of the outer medium 12 differs substantially from the refractive index of both the first fibre cladding 111 and the second fibre cladding 112, light passing the interface 151, 152 between the outer medium 12 and any of said claddings thereby being refracted. Preferably, the refractive index of the outer medium 12 is lower than the refractive index of both claddings 111 and 112, light passing the interface between the outer medium and any of said claddings thereby being converged.

In the core 101, 102 of each fibre, there is provided a deflector (not shown), preferably a blazed phase grating as described above, operative to deflect light out from and in to each core. The deflector is wavelength selective, such that a specific wavelength is deflected at a specific region along the axis of the core. Hence, for example, different wavelength channels of a wavelength division multiplexed optical signal are deflected at different portions along the core. The wavelength selectivity is preferably obtained by a chirped Bragg that is being superimposed upon the deflector (the blazed phase grating). The effect of the chirped grating is described above.

The deflector in the first fibre 41 is operative to deflect light out from the first fibre 41 in the direction of the second fibre 42. The deflected light is converged at the interface 151 between the first fibre cladding 111 and the outer medium 12. When passing the interface 152 between the outer medium 12 and the second fibre cladding 112, the light is further converged towards a focus in the second fibre core 102. Light that is focused onto the second fibre core 102 is subsequently deflected into a guided mode in the second fibre core 102 by the deflector provided in said core. Thus, an arrangement according to the present invention provides transverse coupling of light between two fibres, and the converging effect of the interface between a cladding and an outer medium augments the efficiency of the coupling.

In order to further increase the efficiency of the coupling between the two fibres, there is preferably provided two mirrors 131 and 141 enclosing the fibres 41 and 42. Any light not coupled into a fibre by the blazed phase grating will continue towards one of said mirrors, and consequently be reflected back towards the fibre core again. Preferably, each mirror is provided at or near a location where light from the fibre core is brought to a focus by the converging effect of the interface between the cladding and the outer medium. By symmetry considerations, it is obvious that light is focused onto the fibre core after reflection from a mirror arranged at a focus.

Figure 4:
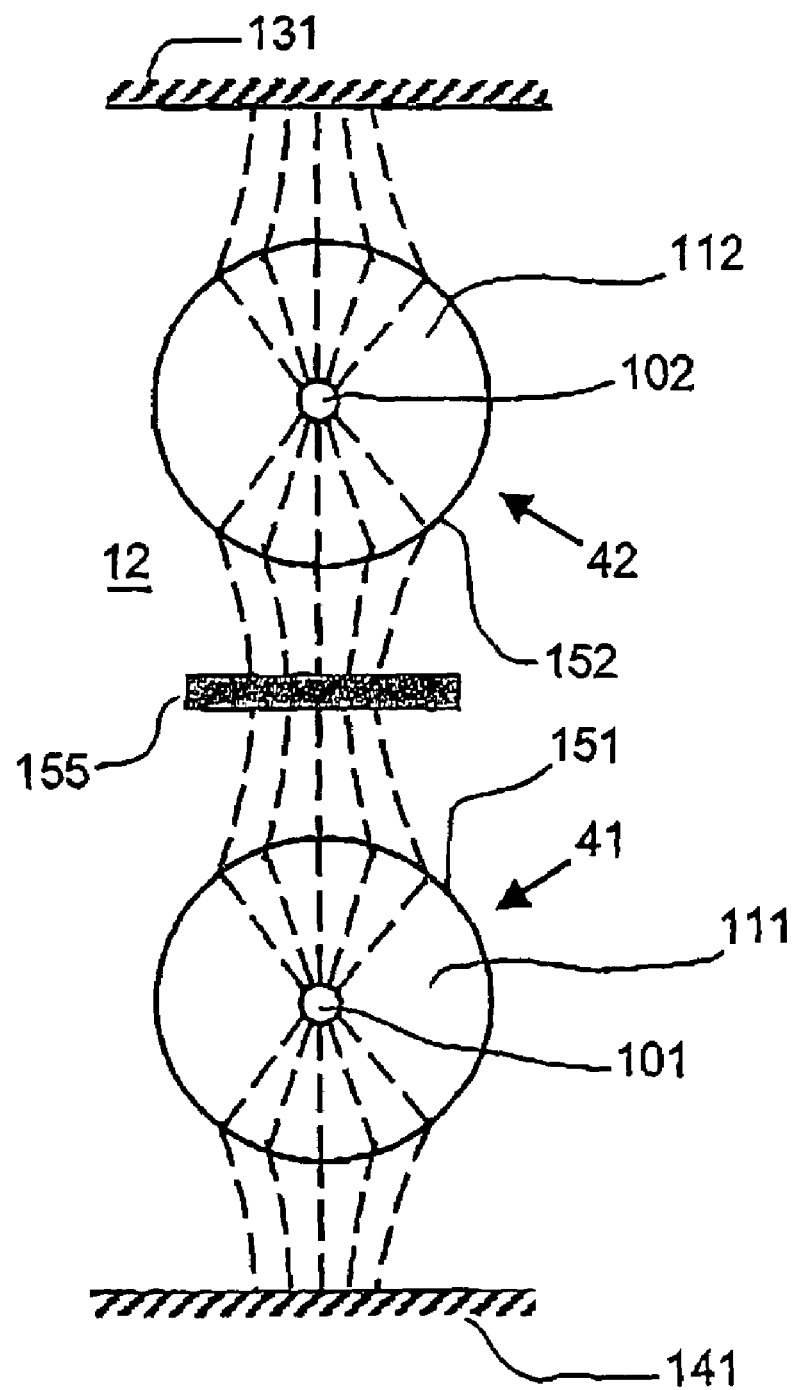
FIG. 4 schematically shows an embodiment of the present invention, comprising two optical fibres between which light is coupled and a light modulator arranged between said two fibres.

In FIG. 4, there is shown an arrangement much alike the one shown in FIG. 3. However, the arrangement shown in FIG. 4 further comprises a light modulator 155, which is provided in the outer medium 12 between the first 41 and the second 42 fibre. The light modulator 155 can be utilised for damping and/or modulating the light coupled between said two fibres. In particular, since light of only a specific wavelength is coupled between the fibres at a specific portion thereof, the light modulator can advantageously be utilised for modulating a single channel within a wavelength division multiplexed optical signal.

Figure 5:
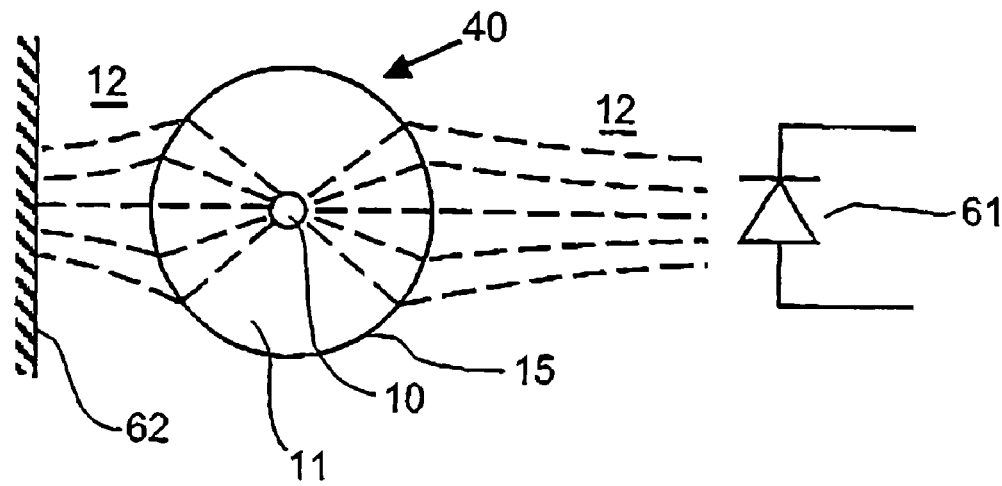
FIG. 5 schematically shows an embodiment of the present invention, in which light is coupled into an optical fibre from a light emitting diode or a laser; or light emanating from the fibre core is detected by means of a photodiode.

FIG. 5 shows schematically an arrangement according to the present invention, in which light of a specific wavelength is launched into an optical fibre 40; or in which light of a specific wavelength is coupled out from the fibre and detected by means of a photodetector. Thus, the schematic symbol of a diode (61) in the figure can designate either a photodetector, or a light source such as a light emitting diode or a laser diode. Of course, any other type of light source is also conceivable.

In a first example, illustrated by FIG. 5, light is coupled out from the fibre 40 and detected by a photodetector 61. In the core 10 of the fibre 40, there is provided a deflector (not shown), preferably comprised of a blazed phase grating as described above, which is operative to deflect light of a specific wavelength towards the photodetector 61. The wavelength selectivity is preferably obtained by means of a chirped Bragg grating superimposed upon the deflector, as described above. Light deflected out from the fibre core is converged at the interface 15 between the fibre cladding 11 and the outer medium 12 towards a focus at the photodetector 61. In order to collect any light possibly deflected out from the fibre 40 in the opposite direction, i.e. away from the photodetector 61, there is preferably provided a mirror 62 at or near a location where light in the opposite direction is brought to a focus by the converging power of the interface 15 between the cladding 11 and the outer medium 12. Thus, light is reflected by said mirror 62, and Subsequently arrives at the photodetector 61.

In a second example, also illustrated by FIG. 5, light is launched into the fibre from an external light source 61. The light source is preferably a laser diode, although any other light source is conceivable within the scope of the invention. The light source 61 is arranged at or near a location where light emanating from the fibre core 10 would be brought to a focus by the converging power of the interface 15 between the cladding 11 and the outer medium 12. Consequently, light from the light source, 61 is brought to a focus at the fibre core 10, and deflected into a guided mode in the fibre core by the deflector provided therein. As before, it is preferred that the deflector is comprised of a blazed phase grating. On the opposite side of the fibre, with respect to the light source 61, there is provided a mirror 62. Any light passing through the fibre core 10 without being deflected into a guiding mode therein is thus reflected back towards the core 10 by the mirror 62. The mirror 62 is placed at or near a location where light is brought to a focus by the converging effect of the interface 15 between the cladding 11 and the outer medium 12. In some cases, it might be desirable to launch light into the fibre from one side only, in which case the mirror 62 is simply removed or left out. In order to enhance the coupling of light to the fibre, a chirped Bragg grating is superimposed upon the blazed phase grating in the fibre core. As described above, the chirped grating provides regions of increased power density for different wavelength components at different portions along the fibre. By virtue thereof, the coupling of a specific wavelength at the region where said wavelength is resonant, is enhanced.

Figure 6:
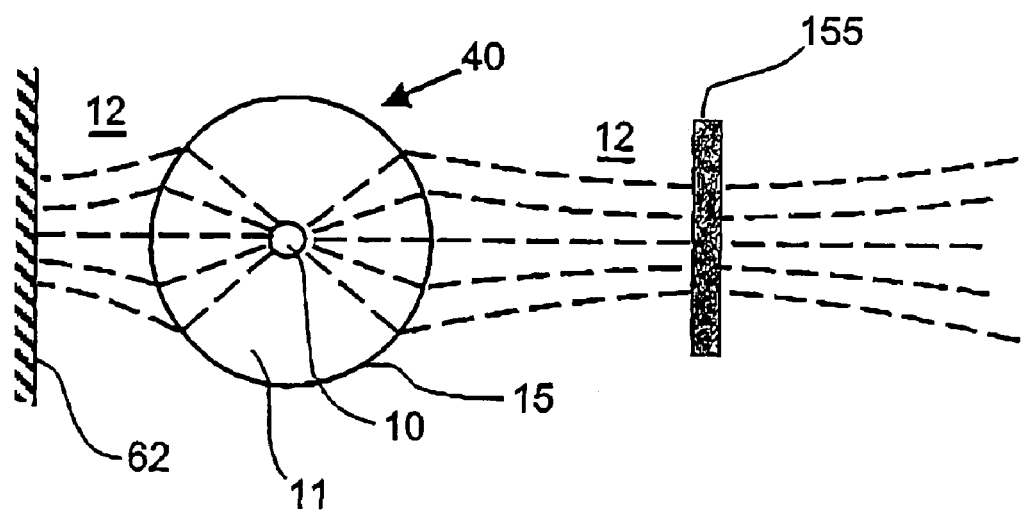
FIG. 6 schematically shows an embodiment of the present invention, in which light coupled out from the waveguiding core, or light to be coupled in to the waveguiding core, is modulated by a light modulator arranged at a location where light is brought to a focus.

Instead of arranging a light source or a photodetector at or near the focus, as schematically shown in FIG. 5, a light modulator 155 could be arranged at said focus. Such an arrangement is schematically shown in FIG. 6. The light modulator 155 can be utilised for damping or modulating light emanating from the fibre or light to be launched into the fibre. Remember that the coupling of light to and from the fibre by the arrangement according to the present invention is wavelength specific. Thus, a modulator could be operative to modulate a carrier wavelength before it is launched into the fibre. The carrier wavelength is then provided by a transmitter of any convenient kind (not shown).

On the other hand, the carrier wavelength could also be extracted from the fibre. In such a case, the fibre carries a continuous wave signal, comprising a plurality of wavelength channels. Each channel is deflected out from the fibre at a different location, by virtue of a chirped Bragg grating as described earlier, and focused by the interface between the cladding and the outer medium towards a respective modulator 155, where it is modulated with an information signal. This situation is closely related to the arrangement schematically shown in FIG. 4. Advantageously, the first fibre shown in FIG. 4 could carry a continuous wave carrier comprising a plurality of wavelength channels. Each carrier channel is deflected at a different portion along the first fibre, and converged by the interface between the first fibre cladding and the outer medium towards the light modulator. At the modulator, the carrier is modulated with an information signal on the fly. Subsequently, the modulated carrier is converged at the interface between the outer medium and the second fibre cladding towards the second fibre core, in which it is deflected into a guided mode, as described earlier.

Figure 7:
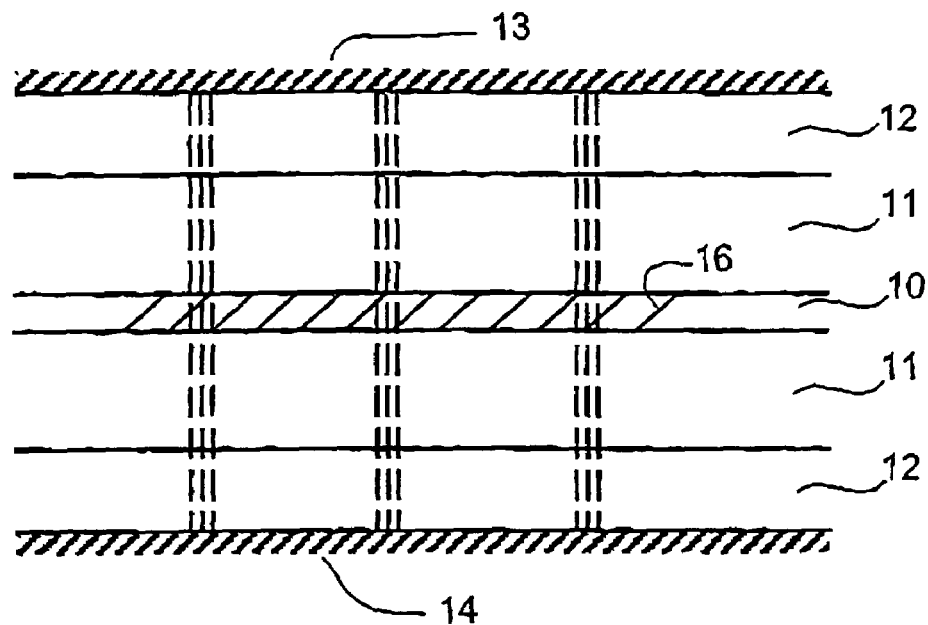
FIG. 7 schematically shows an embodiment of the present invention in which a plurality of optical coupling arrangements are provided in cascade along the waveguiding core.
Figure 8:
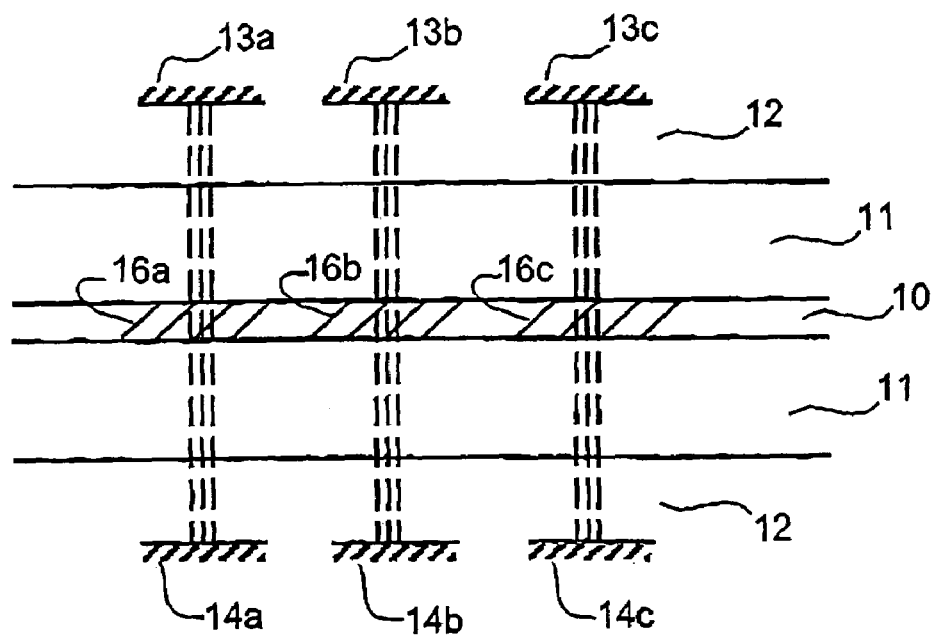
FIG. 8 schematically shows another embodiment of the present invention in which a plurality of optical coupling arrangements are provided in cascade along the waveguiding core.

The cascadeable feature of the present invention is illustrated in FIGS. 7 and 8. In FIG. 7, a continuous blazed grating 16 is utilised for the deflection of light in to and out from the fibre core 10. An external resonator (defined by mirrors 13 and 14) is provided, that encloses the fibre core 10, the fibre cladding 11 and the outer medium 12. In the case shown in FIG. 7, the mirrors in different coupling regions are contiguous in the sense that no physical separations between the mirrors 13 and 14 on any one side of the fibre exist. When utilising a continuous deflecting grating 16, as shown in FIG. 7, it is preferred that the wavelength selective grating (which is superimposed upon the deflecting grating) is a chirped Bragg grating.

As shown in FIG. 8, it is also possible to have a dedicated deflecting grating 16a, 16b, 16c and a dedicated pair of external mirrors 13a, 14a, 13b, 14b, 13c, 14c for each coupling region. In this case, the wavelength selectivity can still be provided by means of a chirped Bragg grating extending through all coupling regions. However, it is also possible to have a separate wavelength discriminating grating in each coupling region, each grating then being superimposed upon the respective deflecting grating 16a, 16b, 16c, or provided on both sides of the respective deflecting grating in, the fibre core.

The invention has been described above with reference to embodiments in which light emanating from a fibre core is converged towards a focus by the refracting effect of an interface between a cladding and an outer medium. Or, equivalently, light coming from the outer medium is converged by the refracting effect of the interface towards a focus in the fibre core. However, it is also conceivable within the scope of the intention to tailor the curvature of said interface between the cladding and the outer medium in order to obtain any shape of the wavefront after the light has passed the interface. This could be done by making the interface between the cladding and the outer medium non-cylindrical, or cylindrical with a superstructure on the surface of the cladding.

The invention claimed is:

1. An optical arrangement, comprising
   a first waveguiding core having a first radius and a first index of refraction;
   a first cladding surrounding said first core, the first cladding having a second radius and a second index of refraction that is lower than said first index of refraction, at least for a predetermined wavelength range;
   an outer medium interfacing said first cladding, the outer medium having a third index of refraction that is lower than said second index of refraction, at least for said predetermined wavelength range;
   a deflector provided in said first waveguiding core, the deflector being operative to deflect light out from said first core in a substantially transverse direction, wherein
   the ratio between said second radius and said first radius is such that light emanating from the first core is collimated, or converged towards a focus, by the interface between the first cladding and the outer medium;
   a second waveguiding core and a second cladding surrounding said second core; the outer medium interfacing both the first cladding and the second cladding, and said second core being provided at a location where light emanating from said first core exhibits a focus; and
   an external resonator enclosing both waveguiding cores and both claddings, the resonator is defined by first and second mirrors.

2. An arrangement as claimed in claim 1, wherein the deflector comprises a blazed phase grating.

3. An arrangement as claimed in claim 1, further comprising a chirped Bragg grating provided in the first waveguiding core, said chirped grating being superimposed on the deflector.

4. An arrangement as claimed in claim 1, wherein the propagation direction of light in the second waveguiding core is substantially parallel to the propagation direction of light in the first waveguiding core from which light is emanating, said second waveguiding core comprising a deflector operative to deflect light which is incident transversally thereupon into a guided mode in said second waveguiding core.

5. An arrangement as claimed in claim 1, wherein the outer medium is comprised of air.

6. An arrangement as claimed in claim 1, wherein the outer medium is comprised of glass.

7. An arrangement as claimed in claim 1, wherein the outer medium is comprised of plastic.

8. An arrangement as claimed in claim 1, comprising a plurality of coupling regions arranged in cascade along the first waveguiding core, each of said coupling regions being operative to couple a specific wavelength in to and out from said first core.

* * * * *